(12) United States Patent
Sato

(10) Patent No.: US 7,346,978 B2
(45) Date of Patent: Mar. 25, 2008

(54) PROCESS OF MAKING A THIN FILM MAGNETIC HEAD

(75) Inventor: Kiyoshi Sato, Niigata-ken (JP)

(73) Assignee: Alps Electric Co., Ltd, Tokyo (JP)

( * ) Notice: Subject to any disclaimer, the term of this patent is extended or adjusted under 35 U.S.C. 154(b) by 548 days.

(21) Appl. No.: 10/858,310

(22) Filed: Jun. 1, 2004

(65) Prior Publication Data

US 2004/0246622 A1    Dec. 9, 2004

(30) Foreign Application Priority Data

Jun. 4, 2003    (JP) .............................. 2003-158756

(51) Int. Cl.
*G11B 5/17* (2006.01)
(52) U.S. Cl. .............................. 29/603.24; 29/603.23; 29/606; 360/123
(58) Field of Classification Search ............. 29/603.23, 29/603.24, 603.26, 603.07, 605, 846, 868; 360/123, 125, 126; 428/815.2, 810
See application file for complete search history.

(56) References Cited

U.S. PATENT DOCUMENTS 5,969,911 A * 10/1999 Hikami et al. .......... 360/126 X
6,459,543 B1 * 10/2002 Sasaki ....................... 360/126

FOREIGN PATENT DOCUMENTS

| JP | 05-046939 | 2/1993 |
| JP | 2001-236614 | 8/2001 |
| JP | 2002-140803 | 7/2002 |
| JP | 2002-216314 | 8/2002 |
| JP | 2003-091802 | 3/2003 |
| JP | 2004-273085 | * 9/2004 |

OTHER PUBLICATIONS

Notification of Refusal dated May 2, 2006, for corresponding Japanese Application No. 2003-158756.

* cited by examiner

*Primary Examiner*—A. Dexter Tugbang
(74) *Attorney, Agent, or Firm*—Brinks Hofer Gilson & Lione

(57) ABSTRACT

A method for manufacturing a thin film magnetic head comprises forming a first magnetic core extending from a surface facing a recording medium in a height direction. The method further comprises forming first coil pieces from a first conductive material on the coil insulating underlayer at a side of the surface facing the recording medium with respect to the connecting region, and simultaneously forming a first metal layer from said first conductive material on the first magnetic core in the back region located from the connecting region in the height direction. The method also comprises forming a coil insulating layer for covering the first coil pieces, and forming the second magnetic core above the first magnetic core. The method further comprises forming a toroidal coil layer, forming second coil pieces from a second conductive material on the insulating layer, and connecting the second coil pieces to the respective first coil pieces, and simultaneously with the formation of the second coil pieces, forming a second metal layer.

3 Claims, 17 Drawing Sheets

FIG. 3
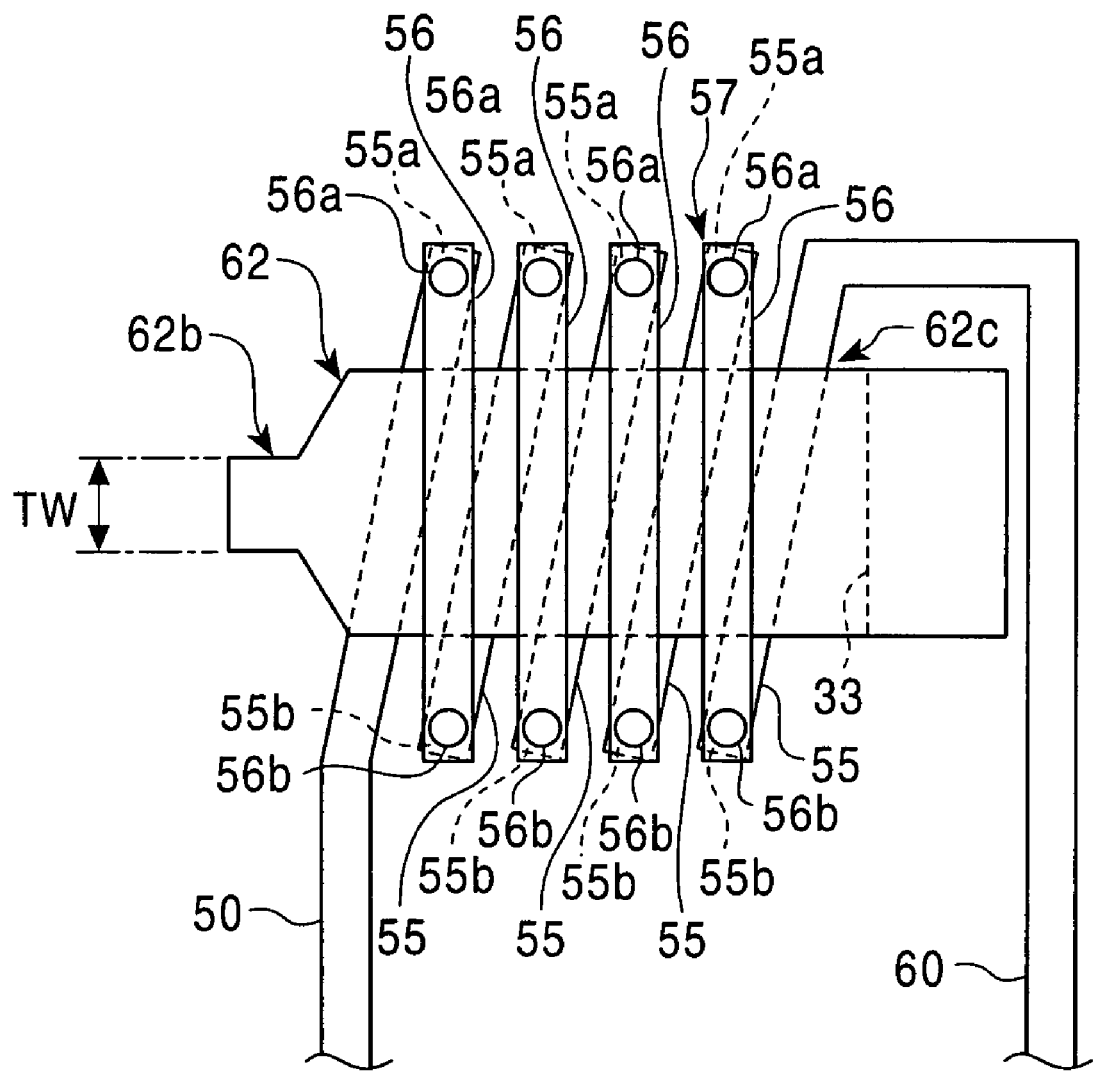
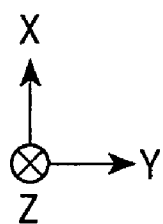

PROCESS OF MAKING A THIN FILM MAGNETIC HEAD

This application claims the benefit of priority to Japanese Patent Application No. 2003-158756, herein incorporated by reference.

BACKGROUND OF THE INVENTION

1. Field of the Invention

The present invention relates to recording thin film magnetic heads having a toroidal coil layer and used for floating type magnetic heads or the like, and more particularly, relates to a thin film magnetic head and a manufacturing method thereof, the thin film magnetic head having a large heat capacitance at a height direction side of a toroidal coil layer and superior heat dissipation properties.

2. Description of the Related Art

In recent years, concomitant with the trend toward higher recording density, miniaturization of recording thin film magnetic heads (inductive heads) having a core layer and a coil layer has increasingly advanced, and as a result, it has become necessary to coil a conductive material in a very small space for forming a coil layer.

Accordingly, instead of a thin film magnetic head having a spiral coil structure, it has been considered that a thin film magnetic head having a toroidal structure may become the major stream of inductive heads. The thin film magnetic head having a toroidal structure is formed by coiling a coil layer in a toroidal manner around a core layer, and the thin film magnetic head having a spiral coil structure is formed by coiling a coil layer around a connecting portion connecting a lower core layer to an upper core layer using a space formed therebetween.

In a compact inductive head formed by using a coil layer having the toroidal structure as described above, in particular, the following problems have occurred. That is, joule heat generated by recording current flowing through the coil layer described above and/or heat caused by eddy current generated in the core cannot be efficiently dissipated from the inductive head described above, and as a result, a problem has occurred in that the temperature therein is very much increased.

When the temperature inside the inductive head is increased as described above, due to the difference in thermal expansion between a coil layer and/or a core layer formed of a metal material and an insulating material surrounding the layers mentioned above, a so-called pole tip protrusion (PTP) problem may arise, that is, a portion at which the above inductive head is formed is liable to protrude from a surface facing a recording medium as compared to the other portions.

In particular, in a thin film magnetic head in which high recording density is realized, since the frequency of a recording current applied to a toroidal coil is high, the temperature inside the inductive head is rapidly increased, and as a result, the protrusion amount from the surface facing a recording medium is increased. When protruding from the surface facing a recording medium, the inductive head may be brought into contact with the recording medium more frequently, and as a result, the recording medium is liable to be damaged, and/or the inductive head is liable to be damaged.

In order to dissipate the heat generated inside the inductive head and to suppress the above PTP problem, various thin film magnetic heads have been proposed, for example, in Japanese Unexamined Patent Application Publication Nos. 2002-216314, 2001-236614, and 5-046939.

In the inductive head described in Japanese Unexamined Patent Application Publication No. 2002-216314, a heat dissipation member formed at the upper side of a lower core layer and/or a heat dissipation member formed at the lower side of the lower core layer is provided. However, since the heat dissipation member formed at the upper side of the lower core layer is covered with an insulating layer formed around a coil layer and is located at a predetermined distance from the lower core layer, heat dissipation properties of the heat dissipation member is not good enough. In addition, since the heat dissipation member is located at a position close to the coil layer, the heat generated therein cannot be easily transferred to a position far away from the coil layer, and hence an inferior heat dissipation effect can only be obtained. In addition, in the inductive head described above, the heat generated in the coil layer is transmitted to a slider through the heat dissipation member formed at the lower side (slider side) of the lower core layer and is then dissipated from this slider. However, since the number of constituent elements provided at the lower side of the lower core layer is larger than that at the upper side of the lower core layer, when a heat dissipation path is considered, the length thereof at the lower side of the lower core layer is large as compared to that at the upper side of the lower core layer, and as a result, the heat dissipation efficiency is not satisfactory. In addition, a magnetoresistive element or the like may be provided at the lower side of the lower core layer described above in many cases, and in the case described above, the heat is liable to be applied to the magnetoresistive element since being transmitted to the side at which the magnetoresistive element is provided.

In the inductive head disclosed in Japanese Unexamined Patent Application Publication No. 2001-236614, instead of a part of a lower core layer located at the height direction side, a heat dissipation member is provided at the same level as that of said part of the lower core layer; however, since this heat dissipation member is formed to have the same thickness as that of the lower core layer, there is a limit to the increase in heat capacity of the heat dissipation member. In addition, in the inductive head described above, since another heat dissipation member is formed at the lower side of the lower core layer and the above-described heat dissipation member, the heat generated in the coil layer is allowed to flow through the lower core layer or the heat dissipation member formed at the same level as that of the lower core layer and finally reaches the slider through said another heat dissipation member, and as a result, the heat is dissipated from this slider. However, since the number of constituent elements provided at the lower side (slider side) of the lower core layer is larger than that at the upper side of the lower core layer, when the heat dissipation path is considered, the length thereof at the lower side of the lower core layer is large as compared to that at the upper side of the lower core layer, and as a result, inferior heat dissipation efficiency can only be obtained. In addition, a magnetoresistive element or the like may be provided at the lower side of the lower core layer described above in many cases, and in the case described above, the heat is liable to be applied to the magnetoresistive element since being transmitted to the side at which the magnetoresistive element is provided. In addition, heat generated in the magnetoresistive element is also unlikely to be dissipated.

In the thin film magnetic head described in Japanese Unexamined Patent Application Publication No. 5-046939, a conductive member in contact with the upper surface of an upper core layer and extending to the upper side from the upper surface of this upper core layer is considered to substantially function as a heat dissipation member for dissipating heat generated in the upper core layer; however, since the area of the conductive member in contact with the upper core layer is very small, it has been believed that the heat dissipation effect is also very small.

SUMMARY OF THE INVENTION

Accordingly, the present invention was made to solve the problems described above, and an object of the present invention is to provide a thin film magnetic head and a manufacturing method thereof, the thin film magnetic head capable of increasing the heat capacitance at a height direction side of a toroidal coil layer and having superior heat dissipation properties.

In accordance with one aspect of the present invention, there is provided a thin film magnetic head which comprises: a first magnetic core extending from a surface facing a recording medium in a height direction; a second magnetic core which is located above the first magnetic core and which is directly or indirectly connected thereto in a connecting region located at a height direction side; a gap layer provided between the first magnetic core and the second magnetic core at the surface facing a recording medium; first coil pieces provided in a space formed between the first magnetic core and the second magnetic core; second coil pieces which are provided above the second magnetic core and which are electrically connected to the first coil pieces to form a toroidal coil layer coiled around the second magnetic core; and at least one metal layer which is composed of a conductive material and which is in contact with at least one of the first magnetic core and the second magnetic core, the metal layer extending in the height direction from the connecting region located at the height direction side in which the first magnetic core and the second magnetic core are connected to each other.

According to the above thin film magnetic head of the present invention, said at least one metal layer made of a conductive material is in direct contact with at least one of the first magnetic core and the second magnetic core and extends in the height direction from the connecting region located at the height direction side in which the first magnetic core and the second magnetic core are connected to each other. Accordingly, the heat capacities of the first magnetic core and the second magnetic core can be increased, and as a result, heat caused by eddy current generated in the first and the second magnetic cores and joule heat generated in the coil layer, in particular, heat generated in the coil layer and in the vicinity of the surface facing a recording medium, can be easily dissipated by the metal layer. Hence, the PTP problem caused by heat generated in the vicinity of the surface facing a recording medium can be suppressed.

In the thin film magnetic head described above, the first magnetic core may have a back region extending from the connecting region in the height direction, and the metal layer may be directly provided on the first magnetic core in the back region.

When the structure as described above is formed, since the heat capacity of the lower magnetic layer in the back region can be increased, the heat dissipation properties can be further increased, and the heat generated in the inductive head can be transmitted to the back region located far from the surface facing a recording medium; hence, the PTP problem at the surface facing a recording medium can be effectively suppressed. In addition, since the heat generated in the inductive head can be transmitted to the upper side (side opposite to the slider) and dissipated therefrom, the length of the heat dissipation path can be decreased as compared to that in the structure in which the heat is transmitted to the lower side (slider side) and is then dissipated from the slider. That is, when the upper side and the lower side are considered as a heat dissipation path with respect to the first magnetic core, many constituent elements are formed at the lower side of the inductive head, that is, at the lower side of the first magnetic core, as compared to those at the upper side of the first magnetic core, and hence the length of the heat dissipation path at the lower side becomes larger than that at the upper side. According to the structure of the thin film magnetic head of the present invention, since the heat can be dissipated to the upper side at which the length of the heat dissipation path is small, the heat dissipation efficiency can be improved. In addition, although a magnetoresistive element or the like is provided at the lower side of the inductive head in many cases, according to the structure of the thin film magnetic head of the present invention, the heat is unlikely to be applied to the magnetoresistive element.

In the thin film magnetic head described above, the first magnetic core may comprise a lower core layer extending from the surface facing a recording medium in the height direction and a connecting layer formed on the lower core layer in the connecting region, the second magnetic core in the connecting region may be located on the connecting layer, and the lower core layer may have a back region extending from the connecting layer in the height direction.

In addition, the first magnetic core may comprise a lower core layer extending from the surface facing a recording medium in the height direction and a protruding layer having a predetermined length from the surface facing a recording medium in the height direction, and the second magnetic core may be provided on the protruding layer with the gap layer interposed therebetween.

Furthermore, the second magnetic core may comprise an upper magnetic layer and an upper core layer provided thereon.

In addition, the metal layer may be in contact with a back end surface of the second magnetic core located at the height direction side and may extend in the height direction.

Although the structure is formed as described above, the heat generated in the inductive head can be transmitted to the upper side (side opposite to the slider) for heat dissipation.

In addition, the metal layer in contact with the first magnetic core layer and the metal layer in contact with the second magnetic core are preferably electrically connected to each other.

According to the structure described above, the heat generated in the coil layer and/or core layer can be easily and effectively dissipated to the upper side of the inductive head.

In addition, the metal layer is preferably electrically insulated from the toroidal coil layer.

According to the structure described above, although the metal layer is provided in direct contact with the magnetic core, the electrical efficiency is not degraded.

In accordance with another aspect of the present invention, there is provided a method for manufacturing a thin film magnetic head, comprising: a step (a) of forming a first magnetic core extending from a surface facing a recording medium in a height direction so as to have a back region extending from a connecting region in the height direction, the connecting region being a region in which the first magnetic core is connected to a second magnetic core which is formed in a subsequent step; a step (b) of forming a coil insulating underlayer on the first magnetic core, followed by the formation of first coil pieces from a conductive material on the coil insulating underlayer at the side of the surface facing a recording medium with respect to the connecting region; a step (c) of, at least after said step (a) and before the following step (d), forming a metal layer using a conductive material on the first magnetic core in the back region located from the connecting region in the height direction; said step (d) of forming a coil insulating layer for covering the first coil pieces; a step (e) of forming the second magnetic core above the first magnetic core, in which the second magnetic core faces the first magnetic core at the surface facing a recording medium with a gap layer interposed therebetween, extends over the coil insulating layer to the first magnetic core in the connecting region, and is directly or indirectly connected to the first magnetic core in the connecting region; and a step (f) of forming a toroidal coil layer by forming an insulating layer on the second magnetic core, forming second coil pieces on the insulating layer, and connecting the second coil pieces to the respective first coil pieces, whereby the second magnetic core is toroidally coiled with the toroidal coil layer.

According to the method for manufacturing a thin film magnetic head, described above, a thin film magnetic head can be manufactured in which heat caused by eddy current generated in the first magnetic core and/or the second magnetic core and joule heat generated in the coil layer can be efficiently dissipated and in which the PTP problem caused by heat generated in the vicinity of the surface facing a recording medium can be suppressed. In addition, according to the manufacturing method described above, the metal layer increasing the heat capacity of the first magnetic core and/or that of the second magnetic core may be formed of a conductive material and may also be formed of the same conductive material as that for the first and the second coil pieces forming the toroidal coil layer, and furthermore, the metal layer may be simultaneously formed when the first coil pieces are formed. Accordingly, a thin film magnetic head having a more efficient heat dissipation effect can be easily formed with a smaller number of manufacturing steps.

In addition, after said step (e), a metal layer may be formed which is in contact with a back end surface of the second magnetic core located at a height direction side and which extends in the height direction.

In addition, the metal layer formed on the upper surface of the first magnetic core in the back region may be electrically connected to the metal layer extending from the back end surface of the second magnetic core in the height direction.

Furthermore, the toroidal coil layer may be electrically insulated from the metal layer formed on the upper surface of the first magnetic core in the back region and the metal layer extending from the back end surface of the second magnetic core in the height direction.

BRIEF DESCRIPTION OF THE DRAWINGS

FIG. 3 is a partial plan view of the thin film magnetic head shown in FIG. 1;

DESCRIPTION OF THE PREFERRED EMBODIMENTS

Figure 1:
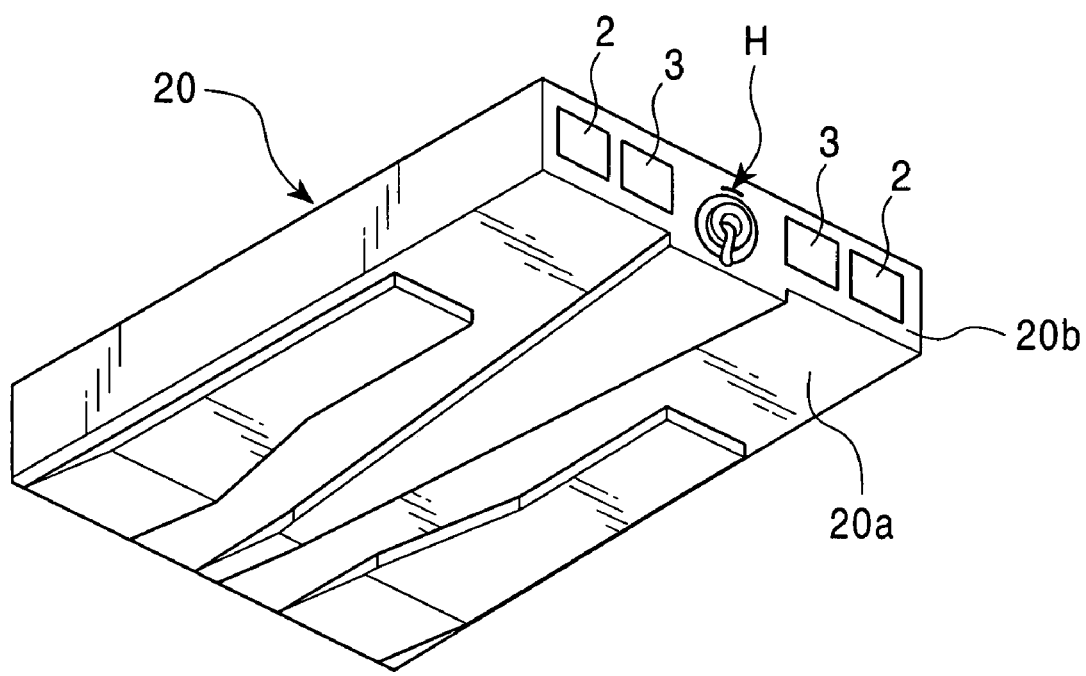
FIG. 1 is a perspective view showing an entire slider provided with a thin film magnetic head according to the present invention.
Figure 2:
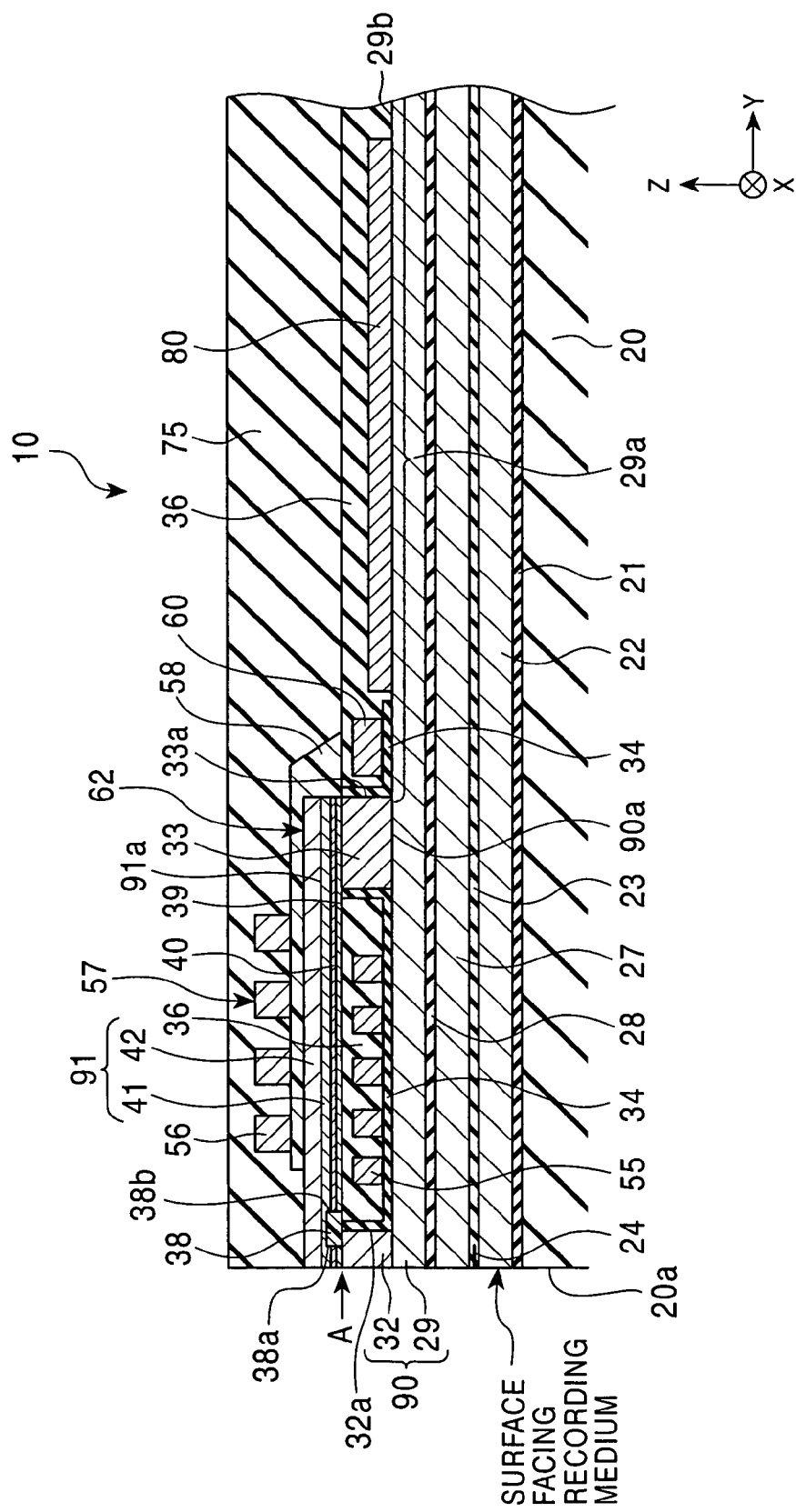
FIG. 2 is a vertical cross-sectional view showing the structure of a thin film magnetic head of a first embodiment according to the present invention.
Figure 4:
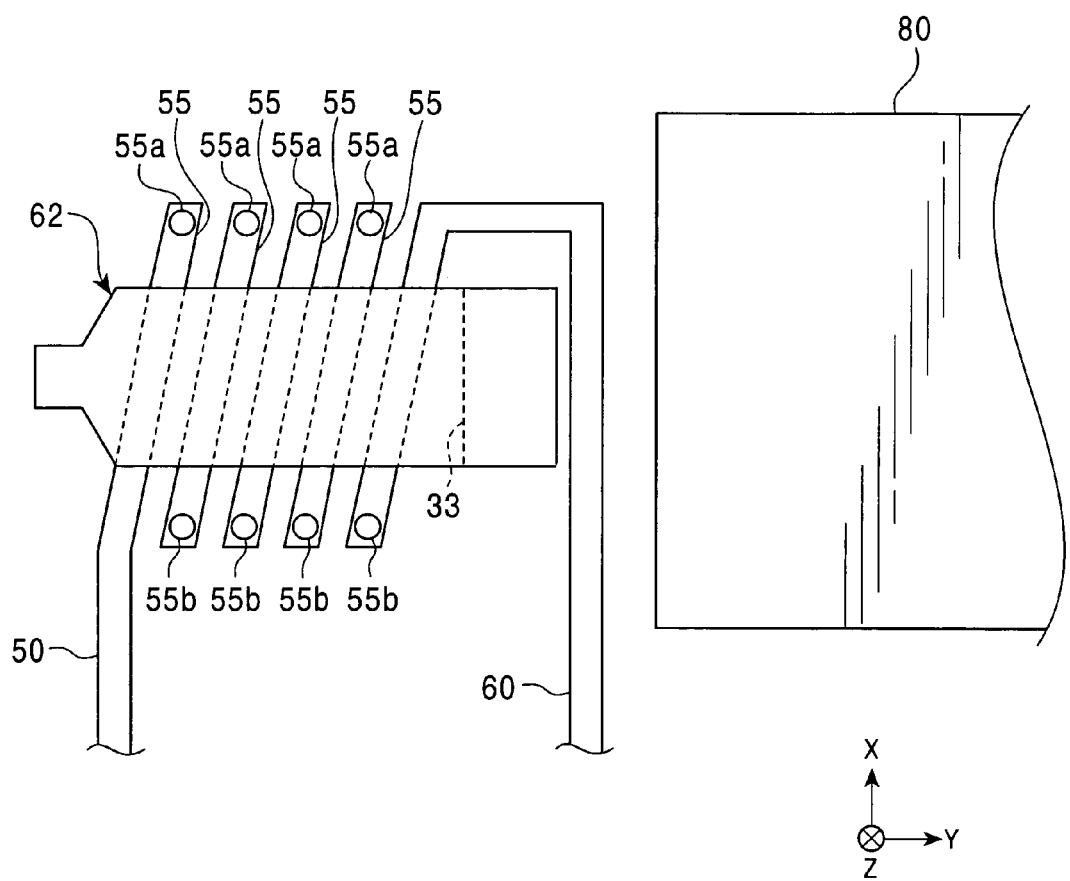
FIG. 4 is a partial plan view of the thin film magnetic head shown in FIG. 1.

FIG. 1 is a perspective view showing an entire slider provided with a thin film magnetic head according to the present invention; FIG. 2 is a partial vertical cross-sectional view showing the structure of a thin film magnetic head of a first embodiment according to the present invention; and FIGS. 3 and 4 are partial plan views each showing the thin film magnetic head shown in FIG. 2.

In the present invention, the X direction shown in the figure is called a "track width direction", and the Y direction in the figure is called a "height direction". In addition, the Z direction in the figure is a traveling direction of a recording medium (magnetic disc). In the present invention, the front end surface (the leftmost surface in FIG. 2) of the thin film magnetic head is called a "surface facing a recording medium". In addition, in individual layers, a "front end surface (front end portion)" indicates the surface at the left side in FIG. 2, and a "back end surface (back end portion)" indicates the surface at the right side in FIG. 2.

In addition, a thin film magnetic head 10 which will be described with reference to drawings is a thin film magnetic head formed of a recording head (called an "inductive head" in some cases) combined with a reproducing head (called an "MR head" in some cases); however, the thin film magnetic head 10 may only be formed of a recording head.

Reference numeral 20 indicates a slider formed of alumina titanium carbide ($Al_2O_3$—TiC) or the like, and a facing surface 20a faces a recording medium. As shown in FIG. 1, on an end portion 20b of the slider 20 at a trailing side, a thin film magnetic head H, terminals 2, and terminals 3 are formed. A toroidal coil layer 57 of an inductive head forming the thin film magnetic head H is connected to the terminals 2 with lead layers interposed therebetween. In addition, when a magnetoresistive element of an MR head is provided, a sense current is applied to the magnetoresistive element from the terminals 3, and a reproducing magnetic signal is obtained from the terminals 3.

As shown in FIG. 2, on the slider 20, an $Al_2O_3$ layer 21 is formed. On the $Al_2O_3$ layer 21, a lower shield layer 22 made of a NiFe alloy, Sendust, or the like is formed, and on this lower shield layer 22, a gap layer 23 composed of a lower gap layer and/or an upper gap layer made of $Al_2O_3$ or the like is formed.

In the gap layer 23, a magnetoresistive element 24 is formed which is typically represented by a GMR element such as a spin valve type thin film element, and the front end surface of the magnetoresistive element 24 is exposed at the surface facing a recording medium.

On the gap layer 23, an upper shield layer 27 made of a NiFe alloy or the like is formed.

A laminate formed of from the lower shield layer 22 to the upper shield layer 27 is called a reproducing head (called an "MR head" in some cases).

On the upper shield layer 27, as shown in FIG. 2, an isolation layer 28 made of $Al_2O_3$ or the like is formed. However, the upper shield layer 27 and the isolation layer 28 may not be provided, and a lower core layer 29 which will be described below may be directly provided on the gap layer 23. In this case, the lower core layer 29 also serves as the upper shield layer.

In FIG. 2, the lower core layer 29 is formed on the isolation layer 28. The lower core layer 29 is formed of a magnetic material such as a NiFe alloy. In addition, the lower core layer 29 is formed so as to have a predetermined length from the surface facing a recording medium in the height direction (Y direction in the figure).

On the lower core layer 29, a protruding layer 32 is formed having a predetermined length from the surface facing a recording medium in the height direction (Y direction in the figure). In addition, a back gap layer 33 is formed on the lower core layer 29 at a predetermined distance from a back end surface 32a of the protruding layer 32 in the height direction (Y direction in the figure).

The protruding layer 32 and the back gap layer 33 are magnetically connected with the lower core layer 29, and the lower core layer 29, the protruding layer 32, and the back gap layer 33 collectively form a first magnetic core 90.

The back gap layer 33 has a function as a connecting layer connecting between the first magnetic core 90 and a second magnetic core 91 which will be described later.

The protruding layer 32 and the back gap layer 33 are formed of a magnetic material and may be or may not be formed of the same material as that of the lower core layer 29. In addition, the protruding layer 32 and the back gap layer 33 may have a monolayer structure and may have a multilayer structure.

As shown in FIG. 2, on the lower core layer 29 between the protruding layer 32 and the back gap layer 33, a coil insulating underlayer 34 is formed, and on this coil insulating underlayer 34, a plurality of first coil pieces 55 made of a conductive material is provided.

The first coil piece 55 is formed of at least one non-magnetic metal material, such as Au, Ag, Pt, Cu, Cr, Al, Ti, NiP, Mo, Pd, or Rh, or may be formed to have a multilayer structure made of the non-magnetic metal materials mentioned above.

The first coil pieces 55 are totally covered with a coil insulating layer 36 made of an inorganic insulating material such as $Al_2O_3$. As shown in FIG. 2, the upper surfaces of the protruding layer 32, the coil insulating layer 36, and the back gap layer 33 collectively form a continuous flat surface along the reference level A shown in FIG. 2.

As shown in FIG. 2, on the flat surface formed of the protruding layer 32 and the coil insulating layer 36, a Gd determining layer 38 is formed at a predetermined distance from the surface facing a recording medium in the height direction (Y direction in the figure).

In addition, as shown in FIG. 2, on the protruding layer 32 from the surface facing a recording medium to a front end surface 38a of the Gd determining layer 38, on the coil insulating layer 36 from a back end surface 38b of the Gd determining layer 38 in the height direction, and on the back gap layer 33, a lower magnetic layer 39 and a gap layer 40 are formed from the bottom in that order. The lower magnetic layer 39 and the gap layer 40 are formed by plating. In addition, the dimension of the gap layer 40 in the height direction is determined by the Gd determining layer 38.

In addition, as shown in FIG. 2, on the gap layer 40 and the Gd determining layer 38, an upper magnetic layer 41 is formed by plating, and furthermore, on the upper magnetic layer 41, an upper core layer 42 is formed by plating.

The upper magnetic layer 41 and the upper core layer 42 collectively form the second magnetic core 91.

As shown in FIG. 2, a connecting region 90a is present at the height direction side of the lower core layer 29 forming the first magnetic core 90. On the lower core layer 29 forming the first magnetic core 90 in the connecting region 90a, the back gap layer 33 is formed, and when the back gap layer 33 and the upper magnetic layer 41 forming the second magnetic core 91 are connected to each other, the magnetic cores 90 and 91 are connected to each other at the height side. In the upper magnetic layer 41 forming the second magnetic core 91, a part facing the back gap layer 33 corresponds to a connecting region 91a of the second magnetic core 91.

In the embodiment shown in FIG. 2, at the height direction side of the Gd determining layer 38, the lower magnetic layer 39 and the gap layer 40 are formed between the second magnetic core 91 and the back gap layer 33, and hence the first magnetic core 90 and the second magnetic core 91 are indirectly connected to each other with the lower magnetic layer 39 and the gap layer 40 interposed therebetween. However, at the height direction side of the Gd determining layer 38, the lower magnetic layer 39 and the gap layer 40 may not be formed. In this case, the first magnetic core 90 and the second magnetic core 91 are to be directly connected to each other.

In this embodiment, the lower magnetic layer 39, the gap layer 40, and the second magnetic core 91 (the upper magnetic layer 41 and the upper core layer 42) collectively form a magnetic layer 62.

At the side (side of the surface facing a recording medium) opposite to the height direction side of the Gd determining layer 38, the lower magnetic layer 39 may not be formed; however, when the lower magnetic layer 39 is formed, formation of narrower gap can be realized.

When the magnetic layer 62 is viewed from above, for example, the structure is as shown in FIG. 3. A front end region 62b of the magnetic layer 62 located at the side of the surface facing a recording medium is formed to have a small width in the track width direction (X direction in the figure), and a track width Tw is determined by the dimension of a front end region 62b at the side of the surface facing a recording medium in the track width direction. The track width Tw is for example 0.7 µm or less and preferably 0.5

µm or less. In addition, the width of a back end region 62c of the magnetic layer 62 in the track width direction is increased from that at a base portion of the front end region 62b along the height direction (Y direction in the figure), and hence the area of the back end region 62c is sufficiently larger than that of the front end region 62b.

As shown in FIG. 2, on the upper core layer 42, an insulating layer 58 made of an insulating material such as a resist is formed. The insulating layer 58 is preferably formed from an organic insulating material.

As shown in FIG. 2, on the insulating layer 58, a plurality of second coil pieces 56 made of a conductive material is formed.

The second coil piece 56 is formed of at least one non-magnetic metal material, such as Au, Ag, Pt, Cu, Cr, Al, Ti, Sn, NiP, Mo, Pd, or Rh. Alternatively, the second coil piece 56 may have a multilayer structure made of the non-magnetic metal materials mentioned above.

End portions of the first coil pieces 55 and respective end portions of the second coil pieces 56 in the track width direction are electrically connected to each other, and a toroidal coil layer 57 coiled around the magnetic layer 62 is formed from the first coil pieces 55 and the second coil pieces 56.

On the toroidal coil layer 57, a protective layer 75 made of an insulating material such as $Al_2O_3$ or AlSiO is formed.

In the thin film magnetic head 10 shown in FIG. 2, the toroidal coil layer 57 coiled around the magnetic layer 62 is formed from the first coil pieces 55 and the second coil pieces 56. FIG. 3 is a partial plan view of the thin film magnetic head shown in FIG. 2, and in this figure, the magnetic layer 62, the first coil pieces 55, the second coil pieces 56, and lead layers 50 and 60 are only shown.

As shown in FIG. 3, the second coil piece 56 has connecting portions 56a and 56b at the two sides in the track width direction (X direction in the figure), and in addition, the first coil piece 55 also has connecting portion 55a and 55b at the two sides in the track width direction. One connecting portion 55a of the first coil piece 55 is electrically connected to one connecting portion (end portion) 56a of the second coil piece 56 located at a position facing to the above connecting portion 55a in the thickness direction (Z direction in the figure) directly or indirectly with another connecting layer (not shown) provided therebetween. In addition, the other connecting portion 55b of the first coil piece 55 is electrically connected to the other connecting portion (end portion) 56a of the second coil piece 56, which is located at a position adjacent to the above second coil piece 56 at the side of the surface facing to a recording medium, directly or indirectly with another connecting layer (not shown) provided therebetween. Since the first coil pieces 55 and the second coil pieces 56 are connected to each other in a zigzag manner as described above, the toroidal coil layer 57 coiled around the magnetic layer 62 is formed.

The lead layer 60 is extended from the same layer for the first coil piece 55, is coiled around approximately a half of the back gap layer 33, and is then extended to the outward direction of the toroidal coil layer 57. A base portion (not shown) of the lead layer 60 is connected to one of the terminals 2 described above. In addition, the lead layer 50 is also extended from the same layer for the coil piece 55 and is connected to the other terminal 2. In addition, the lead layers 50 and 60 may be formed separately from the first coil pieces 55.

Next, the features of the thin film magnetic head 10 shown in FIGS. 2 and 3 will be described.

As shown in FIG. 2, the lower core layer 29 has a back region 29a extending from the connecting regions 90a and 91a in the height direction, that is, the back region 29a is a region extending from a back end surface 33a of the back gap layer 33 in the height direction.

On the upper surface of the lower core layer 29 in the back region 29a, a first metal layer 80 is formed from a conductive material. The first metal layer 80 extends flat and parallel with an upper surface 29b of the lower core layer 29 in the back region 29a in the height direction. As is the first coil pieces 55, the first metal layer 80 is formed on the lower core layer 29 at the level approximately equivalent to that of the first coil pieces 55; however, unlike the first coil pieces 55, the first metal layer 80 is formed in direct contact with the upper surface 29b of the lower core layer 29 in the back region 29a, and hence another constituent element such as the coil insulating underlayer 34 is not provided between the upper surface 29b of the lower core layer 29 in the back region 29a and the first metal layer 80.

Although the first metal layer 80 may be formed of a material different from that for the first coil pieces 55, the same material is preferably used. When the first metal layer 80 and the first coil pieces 55 are formed of the same material, the first metal layer 80 and the first coil pieces 55 may be simultaneously formed in the same step, and as a result, the thin film magnetic head 10 can be easily formed with a smaller number of manufacturing steps.

The upper surface of the first metal layer 80 is covered with the coil insulating layer 36, and the protective layer 75 is continuously formed over the toroidal coil layer 57 to the coil insulating layer 36.

FIG. 4 is a partial plan view of the thin film magnetic head 10 shown in FIG. 2, and in this figure, the magnetic layer 62, the first coil pieces 55, the lead layers 50 and 60, and the first metal layer 80 are only shown. As shown in FIG. 4, the first metal layer 80 is formed flat on the upper surface 29b of the lower core layer 29 in the back region 29a and has predetermined width and length dimensions. In addition, the first metal layer 80 is separated from the first coil pieces 55 and is electrically insulated therefrom.

In the thin film magnetic head 10 of the embodiment shown in FIGS. 2 and 4, the lower core layer 29 in the back region 29a can serve as a heat-transmitting layer for dissipating joule heat generated in the toroidal coil layer 57 and heat caused by eddy current generated in the lower core layer 29, the magnetic layer 62, the protruding layer 32, and the back gap layer 33 to the back side in the height direction. Hence, the heat generated in the inductive head can be transmitted to the height direction side apart from the surface facing a recording medium, and as a result, the PTP problem at the surface facing a recording medium can be easily suppressed.

In addition, the first metal layer 80 is in direct contact with the upper surface 29b of the lower core layer 29 in the back region 29a and extends flat and parallel with the upper surface 29b in the height direction. The first metal layer 80 is formed of at least one non-magnetic metal material such as Au, Ag, Pt, Cu, Cr, Al, Ti, NiP, Mo, Pd, or Rh, or has a multilayer structure made of the non-magnetic metal materials mentioned above. The first metal layer 80 has a high thermal conductivity as compared to that of the lower core layer 29 and that of the upper shield layer 27 formed thereunder. Hence, the heat capacity of the lower core layer 29 in the back region 29a can be increased.

In addition, since the first metal layer 80 extends in the height direction, the heat caused by eddy current generated in the lower core layer 29 and the joule heat generated in the toroidal coil layer 57 can be transmitted to the height direction side apart from the surface facing a recording medium, and as a result, the PTP problem at the surface facing a recording medium can be more effectively suppressed.

In particular, the first metal layer 80 is in direct contact with the upper surface 29b of the lower core layer 29 in the back region 29a, and any insulating layer is not provided therebetween. Hence, for example, when an insulating layer is formed between the upper surface 29b of the lower core layer 29 in the back region 29a and the first metal layer 80, the heat capacity in the back region 29a is decreased by a decreased volume of the first metal layer 80, which corresponds to the volume of the insulating layer. However, in the thin film magnetic head 10 of the embodiment shown in FIGS. 2 and 4, since the first metal layer 80 is directly provided on the upper surface 29b of the lower core layer 29 in the back region 29a without any insulating layer interposed therebetween, the heat capacity thereof can be increased.

The reason the first metal layer 80 can be directly formed on the upper surface 29b of the lower core layer 29 in the back region 29a is that the first metal layer 80 is electrically insulated from the first coil pieces 55. However, even in the case in which the first metal layer 80 is not electrically insulated from the first coil pieces 55 and is electrically connected thereto, when the state is ensured in which short-circuiting will not occur at all, the first metal layer 80 may be directly provided on the upper surface 29b of the lower core layer 29 in the back region 29a.

In addition, since the first metal layer 80 is formed on the upper surface 29b of the lower core layer 29 in the back region 29a, the heat transmitted to the back region 29a is further transmitted to the first metal layer 80 side formed at the upper side and is then dissipated to the outside through the coil insulating layer 36 and the protective layer 75 in that order. Hence, the heat generated in the inductive head can be transmitted to the upper side (Z direction in the figure, that is, direction opposite to the slider 20) and dissipated therefrom.

When the heat generated in the inductive head is dissipated to the upper side, the length of the heat dissipation path can be small as compared to that in the structure in which the heat is transmitted to the lower side (opposite to Z direction in the figure, that is, direction toward the slider 20) and is then dissipated from the slider, and hence the heat dissipation efficiency can be improved. That is, under the inductive head, since various constituent elements such as the upper shield layer 27 and the lower shield layer 22 are formed, the number of the constituent elements is larger than that above the lower core layer 29, and as a result, the length of the heat dissipation path under the inductive head becomes large as compared to that above the inductive head. In the thin film magnetic head 10 of the embodiment shown in FIGS. 2 and 4, the heat can be dissipated to the upper side at which the length of the heat dissipation path is small, and as a result, the heat dissipation efficiency can be improved.

In addition, the magnetoresistive element 24 is provided under the inductive head in many cases; however, according to the structure of the thin film magnetic head 10 of the present invention, since dissipated to the upper side, the heat is unlikely to be applied to the magnetoresistive element.

Figure 5:
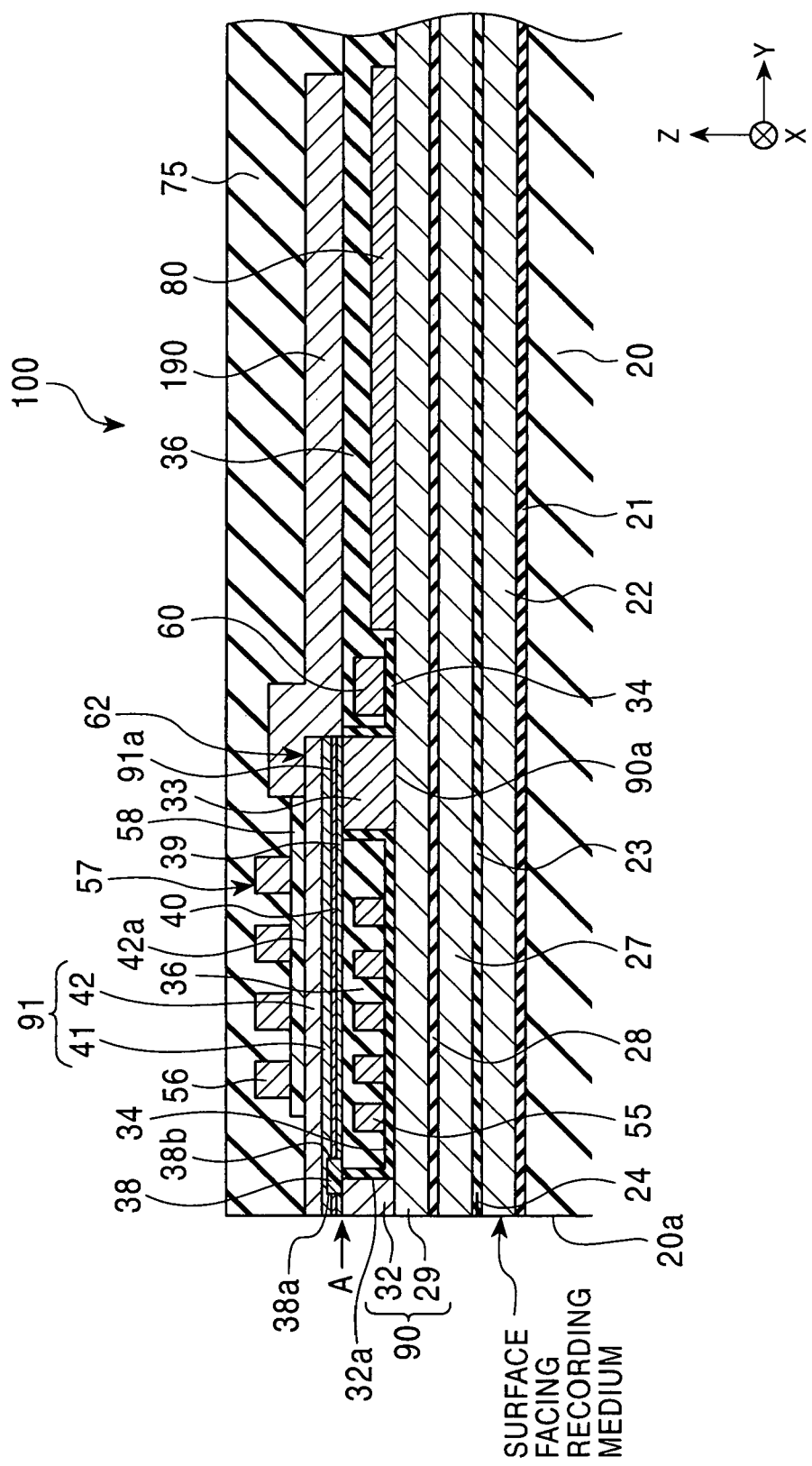
FIG. 5 is a vertical cross-sectional view showing the structure of a thin film magnetic head of a second embodiment according to the present invention.
Figure 6:
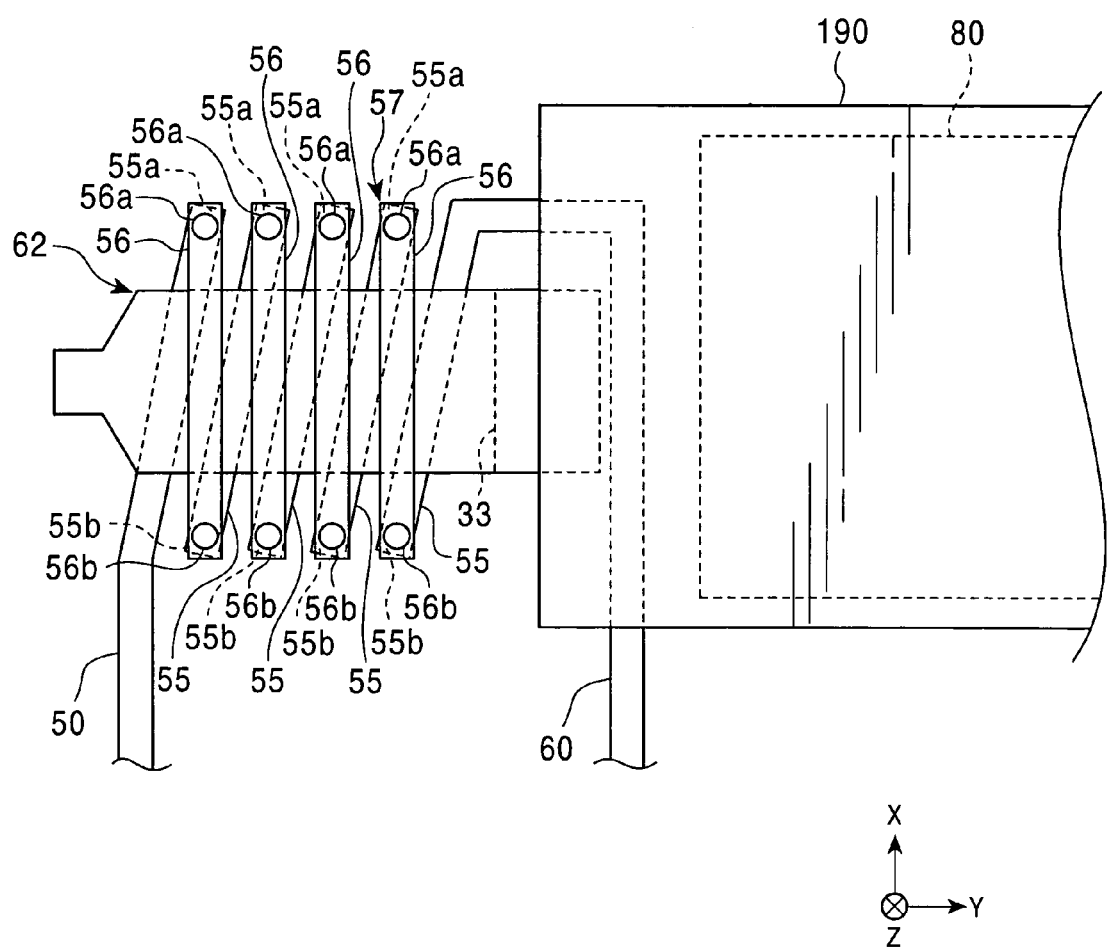
FIG. 6 is a partial plan view of the thin film magnetic head shown in FIG. 5.

FIG. 5 is a partial vertical cross-sectional view showing the structure of a thin film magnetic head of a second embodiment according to the present invention and corresponds to FIG. 2. FIG. 6 is a partial plan view of the thin film magnetic head shown in FIG. 5 and corresponds to FIG. 4.

A thin film magnetic head 100 shown in FIGS. 5 and 6 has the structure approximately equivalent to that of the thin film magnetic head 10 shown in FIGS. 2 and 4. Accordingly, in the thin film magnetic head 100 shown in FIGS. 5 and 6, the same reference numerals of the thin film magnetic head 10 designate elements having the same structures as those of the thin film magnetic head 10, and descriptions thereof will be omitted.

In the thin film magnetic head 100 shown in FIGS. 5 and 6, unlike the thin film magnetic head 10 shown in FIGS. 2 and 4, a second metal layer 190 is provided so as to extend over a part of the upper surface 42a of the upper core layer 42 to the coil insulating layer 36 in the height direction.

FIG. 6 is a partial plan view of the thin film magnetic head 100 shown in FIG. 5, and in this figure, the magnetic layer 62, the first coil pieces 55, the second coil pieces 56, the leads layers 50 and 60, the first metal layer 80, and the second metal layer 190 are only shown.

As shown in FIG. 6, the second metal layer 190 has predetermined width and length dimensions and is formed to extend flat from the part of the upper surface 42a of the upper core layer 42 in the height direction. In addition, the second metal layer 190 is separated from the second coil pieces 56 and is electrically isolated therefrom.

As shown in FIG. 5, the second metal layer 190 is in contact with the part (in the vicinity of the back gap layer 33) of the upper surface 42a of the upper core layer 42 and extends flat and parallel with the upper surface 42a in the height direction. The second metal layer 190 is formed of at least one non-magnetic metal material, such as Au, Ag, Pt, Cu, Cr, Al, Ti, NiP, Mo, Pd, or Rh, or is formed to have a multilayer structure made of the non-magnetic metal materials mentioned above. The second metal layer 190 has a higher thermal conductivity than that of the upper magnetic layer 41 formed under the upper core layer 42 and the insulating layer 58 formed on the upper core layer 42.

Accordingly, when the heat caused by eddy current generated in the upper core layer 42 and the joule heat generated in the toroidal coil layer 57 are transmitted to the upper core layer 42, heat present in the upper core layer 42 is transmitted to the second metal layer 190. In addition, since the second metal layer 190 extends in the height direction, the heat generated in the inductive head can be dissipated to the height direction side apart from the surface facing a recording medium, and as a result, the PTP problem at the surface facing a recording medium can be effectively suppressed.

In addition, as is the case of the first metal layer 80, the second metal layer 190 is provided in direct contact with the upper surface 42a of the upper core layer 42, and any insulating layer or the like is not provided therebetween. Hence, the heat capacity of the upper core layer 42 can be increased.

The reason the second metal layer 190 can be formed directly on the upper surface 42a of the upper core layer 42 is that the second metal layer 190 is electrically insulated from the second coil pieces 56. However, even in the case in which the second metal layer 190 is not electrically insulated from the second coil pieces 56 and is electrically connected thereto, when the state is ensured in which short-circuiting will not occur at all, the second metal layer 190 may be provided directly on the upper surface 42a of the upper core layer 42.

In addition, when the upper side (Z direction in the figure, direction opposite to the slider 20) and the lower side (direction opposite to the Z direction in the figure, direction to the slider 20) of the second metal layer 190 are compared to each other, as can be seen in FIG. 5, the length at the upper side to the outside (the air) of the thin film magnetic head 100 is small as compared to that at the lower side. Hence, the heat transmitted to the second metal layer 190 is to be dissipated to the upper side of the thin film magnetic head 100. Accordingly, even when the magnetoresistive element 24 is provided at the lower side of the inductive head, the heat is unlikely to be applied to the magnetoresistive element 24.

Since the thin film magnetic head described above has the structure in which heat dissipation can be performed through the second metal layer 190 in addition to that through the first metal layer 80, the heat generated in the inductive head can be more efficiently dissipated. Hence, the PTP problem described above can be effectively suppressed.

The second metal layer 190 may be formed of a material different from that for the second coil pieces 56; however, the same material is preferably used. When formed of the same material as that for the second coil pieces 56, the second metal layer 190 can be formed simultaneously with the second coil pieces 56 in the same step, and as a result, the thin film magnetic head 100 can be easily formed with a smaller number of manufacturing steps.

In the embodiment shown in FIG. 6, the width dimension of the second metal layer 190 is formed larger than that of the first metal layer 80; however, the present invention is not limited thereto. For example, the structure in which the width dimension of the first metal layer 80 is formed larger than that of the second metal layer 190 or the structure in which the first and the second metal layers have the same with dimension may be formed. The structures described above are also equally applied to the length dimensions of the two metal layers 80 and 190.

Figure 7:
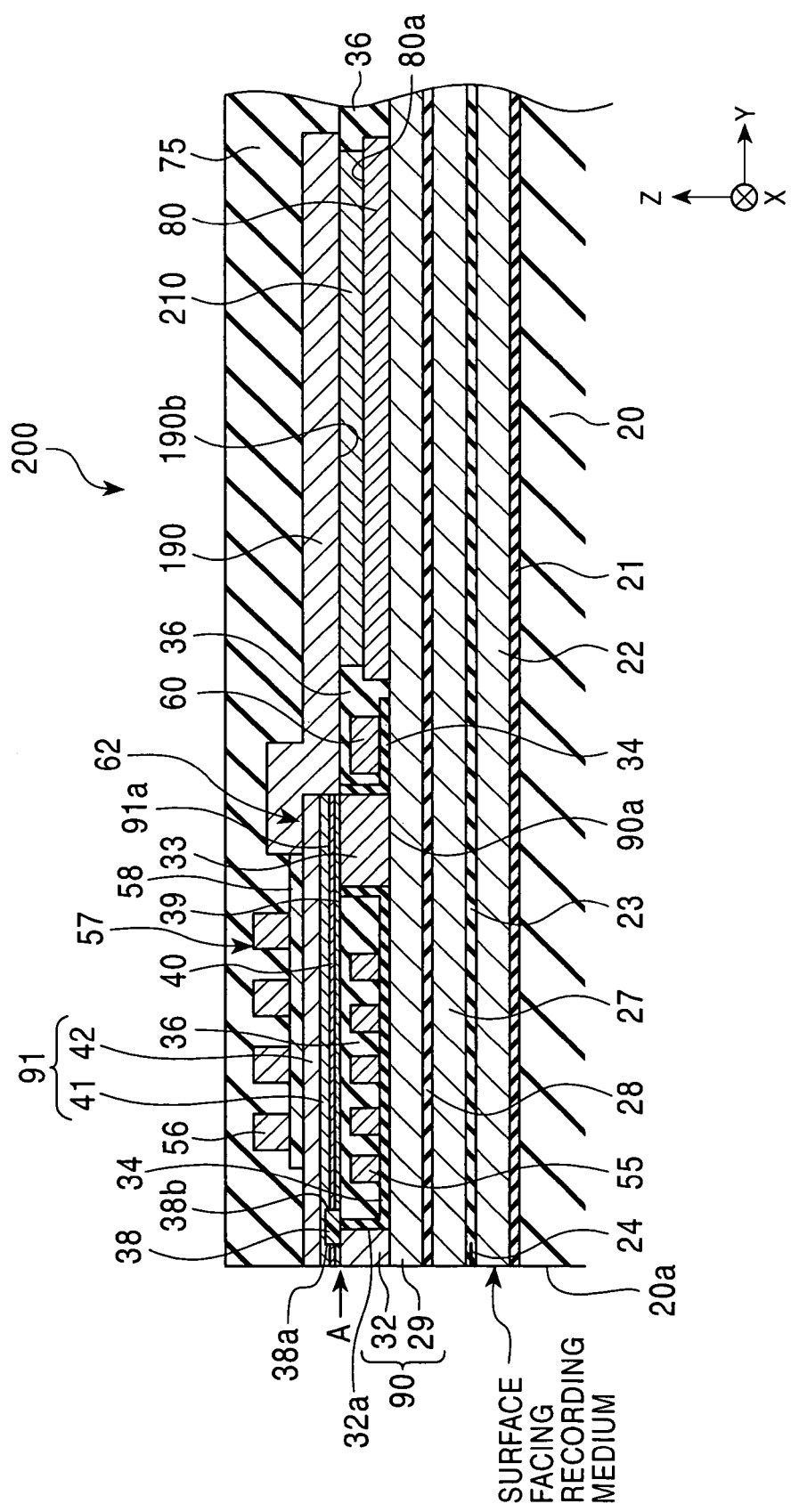
FIG. 7 is a vertical cross-sectional view showing the structure of a thin film magnetic head of a third embodiment according to the present invention.
Figure 8:
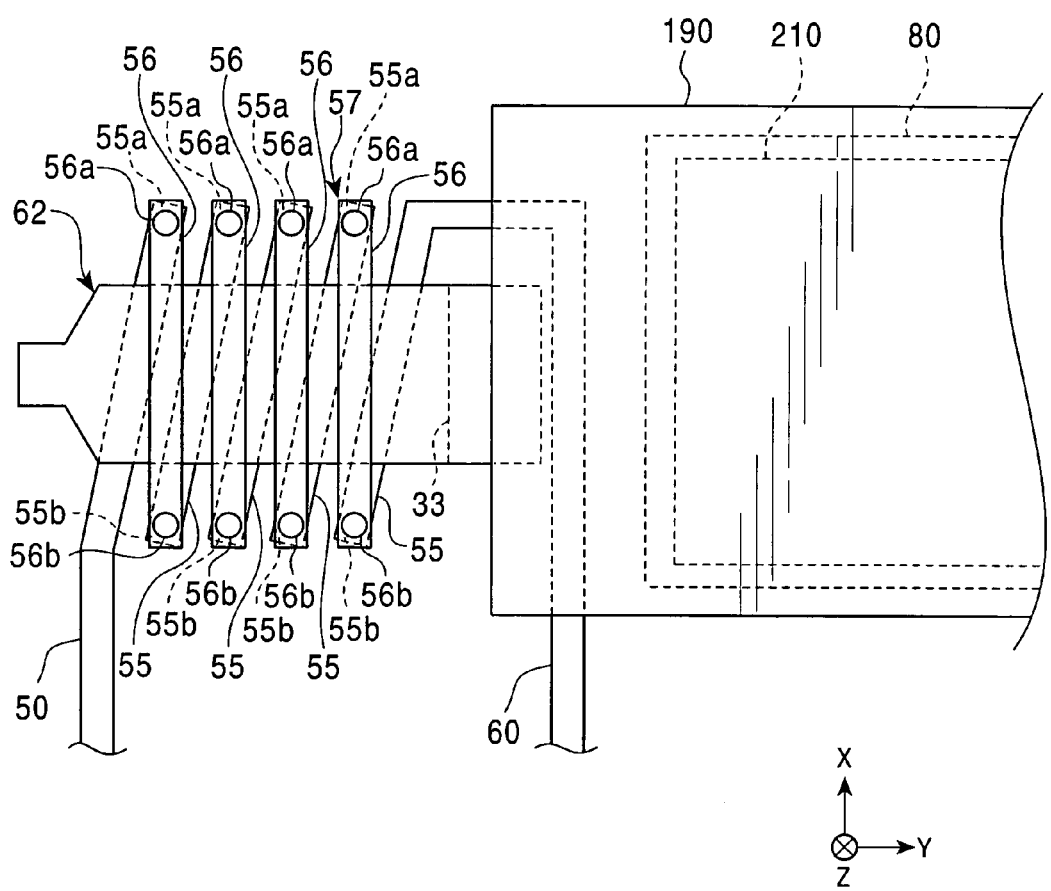
FIG. 8 is a partial plan view of the thin film magnetic head shown in FIG. 7.

FIG. 7 is a partial vertical cross-sectional view showing the structure of a thin film magnetic head of a third embodiment according to the present invention and corresponds to FIG. 2. FIG. 8 is a partial plan view of the thin film magnetic head shown in FIG. 7 and corresponds to FIG. 4.

A thin film magnetic head 200 shown in FIGS. 7 and 8 has the structure approximately equivalent to that of the thin film magnetic head 100 shown in FIGS. 5 and 6. Accordingly, in the thin film magnetic head 200 shown in FIGS. 7 and 8, the same reference numerals of the thin film magnetic head 100 designate elements having the same structures as those of the thin film magnetic head 100, and descriptions thereof will be omitted.

Unlike the thin film magnetic head 100 shown in FIGS. 5 and 6, in the thin film magnetic head 200 shown in FIGS. 7 and 8, an upper surface 80a of the first metal layer 80 and a lower surface 190b of the second metal layer 190 are electrically connected to each other with a connecting layer 210 provided therebetween.

This connecting layer 210 is preferably formed of a metal material, such as Cu or Ni, having a high thermal conductivity. In addition, the connecting layer 210 may be formed of the same material as that for the back gap layer 33. Furthermore, when the connecting portion 55a of the first coil piece 55 and the connecting portion 56a of the second coil piece 56 are electrically connected to each other with a different connecting layer interposed therebetween, the connecting layer 210 may be formed of the same material as that for said different connecting layer.

In the thin film magnetic head 200 shown in FIGS. 7 and 8, since heat transmitted to the first metal layer 80 is further transmitted to the second metal layer 190 formed at the upper side thereof through the connecting layer 210, the dissipation effect can be further increased, and in addition, the heat described above can be more easily dissipated to the upper side of the inductive head.

The thin film magnetic head of the present invention is not limited to those of the embodiments shown in FIGS. 2, 5, and 7, the structure may also be formed in which the second metal layer 190 is only formed and the first metal layer 80 is not formed, the second metal layer 190 being in contact with the back end surface of the magnetic layer 62 at the height direction side and extending in the height direction. That is, for example, in the thin film magnetic head 100 shown in FIG. 5, the structure may be formed in which the first metal layer 80 is not formed, and the second metal layer 190 is only formed.

A method for manufacturing the thin film magnetic head 10 shown in FIG. 1 will be described with reference to FIGS. 9 to 15 which show manufacturing steps thereof. In the manufacturing method described below, methods for forming the individual layers from the lower core layer 29 to the protective layer 75 will be described. In addition, the vertical cross-sectional views of the thin film magnetic head in the course of manufacture are shown in the figures for illustrating the manufacturing steps.

Figure 9:
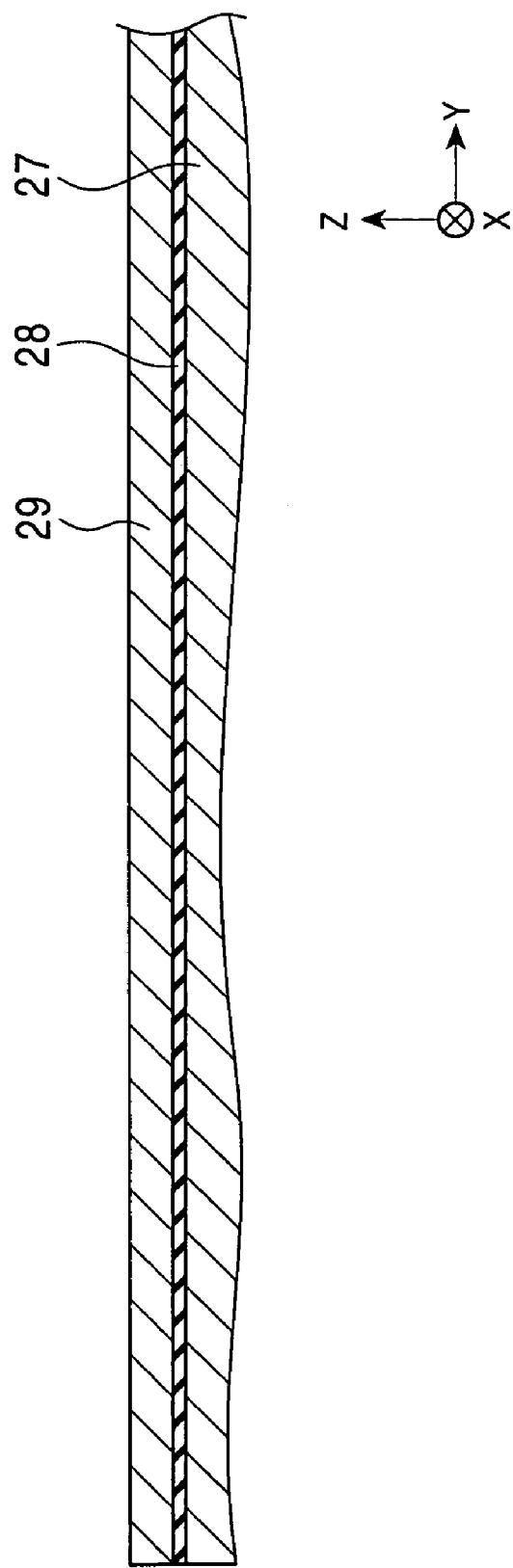
FIG. 9 is a schematic view showing one step of a manufacturing method, according to the present invention, of the thin film magnetic head shown in FIG. 1.

In the step shown in FIG. 9, on the isolation layer 28 formed on the upper shield layer 27, the lower core layer 29 made of a NiFe alloy or the like is formed by plating. In this step, the lower core layer 29 is formed to extend further from the back end surface 33a of the back gap layer 33 in the height direction, the back gap layer 33 being formed in the step shown in FIG. 10 described later. In addition, the surface of the lower core layer 29 is polished to form a flat surface.

Figure 10:
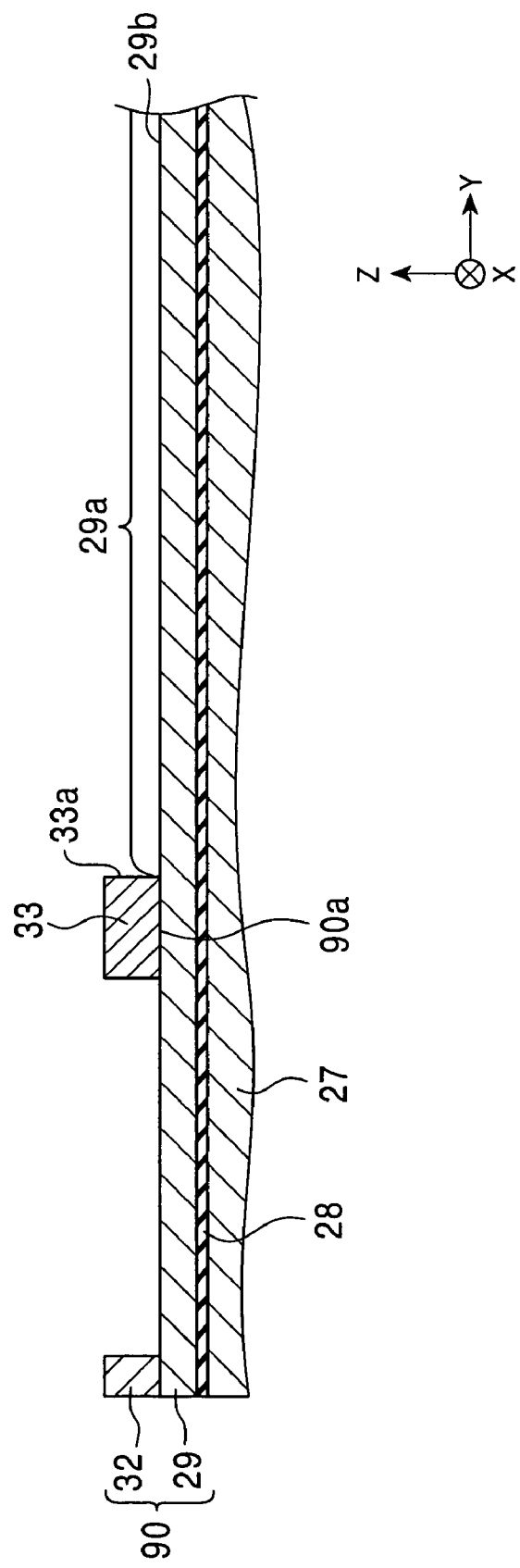
FIG. 10 is a schematic view showing a step performed following the step shown in FIG. 9.

In the step shown in FIG. 10, the protruding layer 32 and the back gap layer 33 are formed on the surface of the lower core layer 29. The protruding layer 32 and the back gap layer 33 are formed by the steps of forming a pattern in a resist layer (not shown) by exposure and development and filling a magnetic material layer in the pattern by plating or the like.

The protruding layer 32 and the back gap layer 33 are formed so as to be magnetically connected with the lower core layer 29, and the lower core layer 29, the protruding layer 32, and the back gap layer 33 collectively form the first magnetic core 90.

The back gap layer 33 functions as the connecting layer connecting the first magnetic core 90 and the second magnetic core 91 described later. Subsequently, the resist layer is removed. The upper surface of the protruding layer 32 and the upper surface of the back gap layer 33 are preferably formed to be approximately at the same level. The lower core layer 29 extending from the back end surface 33a of the back gap layer 33 in the height direction is the back region 29a of the lower core layer 29.

Figure 11:
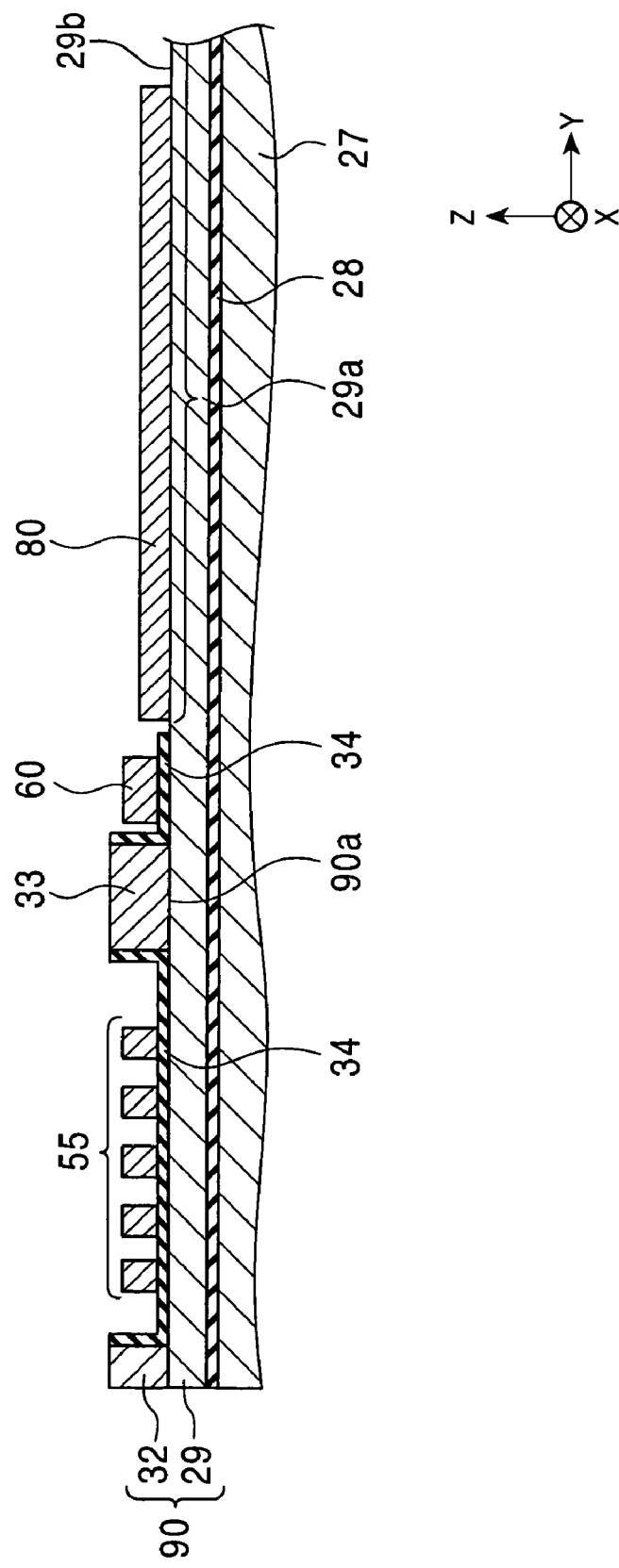
FIG. 11 is a schematic view showing a step performed following the step shown in FIG. 10.

In the step shown in FIG. 11, in the space surrounded by the lower core layer 29, the protruding layer 32, and the back gap layer 33, the coil insulating underlayer 34 made of an insulating material such as $Al_2O_3$ or $SiO_2$ is formed by sputtering or the like. In addition, the coil insulating underlayer 34 is also formed on the back end surface 33a of the back gap layer 33 at the height direction side and on part of the lower core layer 29 in the back region. Next, on the coil insulating underlayer 34, the first coil pieces 55 extending in the direction intersecting the height direction are formed. The first coil pieces 55 are formed of at least one non-magnetic metal material, such as Au, Ag, Pt, Cu, Cr, Al, Ti, NiP, Mo, Pd, or Rh, by plating or may be formed to have a multilayer structure made of the non-magnetic metal materials mentioned above. In addition, on the coil insulating underlayer 34 formed on the lower core layer 29a in the back region 29a, the lead layer 60 shown in FIGS. 2 and 3 is also formed. The lead layer 60 is formed of the same material as that for the first coil pieces 55.

At the same time when the first coil pieces 55 and the lead layer 60 are formed, the first metal layer 80 is formed by plating directly on the upper surface 29b of the lower core layer 29 in the back region 29a using the same material as that for the first coil pieces 55 and the lead layer 60. The first metal layer 80 is formed to extend flat and parallel with the upper surface 29b of the lower core layer 29 in the back region 29a in the height direction.

The first metal layer 80 may be formed of a material different from that for the first coil pieces 55 and may not be simultaneously formed therewith. However, since the first metal layer 80 can be simultaneously formed with the first coil pieces 55 when formed of the same material as that for the first coil pieces 55, the number of the manufacturing steps can be decreased, and the thin film magnetic head 10 having a large dissipation effect can be easily formed.

Figure 12:
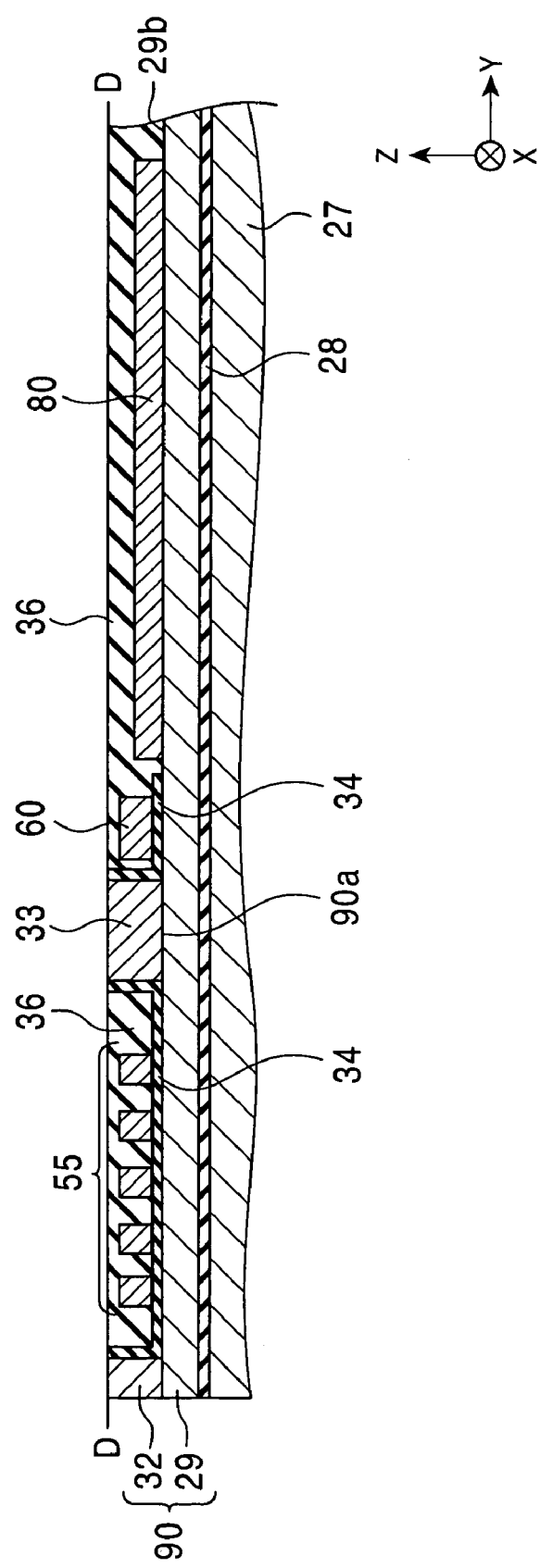
FIG. 12 is a schematic view showing a step performed following the step shown in FIG. 11.

Next, in the step shown in FIG. 12, on and between the first coil pieces 55, and on the protruding layer 32 and the back gap layer 33, the coil insulating layer 36 made of $Al_2O_3$ or the like is provided for covering. The coil insulating layer 36 is formed by sputtering or the like. In addition, the coil insulating layer 36 also covers the lead layer 60, the first metal layer 80, and the lower core layer 29 in the back region 29a.

Subsequently, the coil insulating layer 36 is milled by a CMP technique or the like to the level indicated by the D-D line in FIG. 12 along the direction parallel to the X-Y plane.

Figure 13:
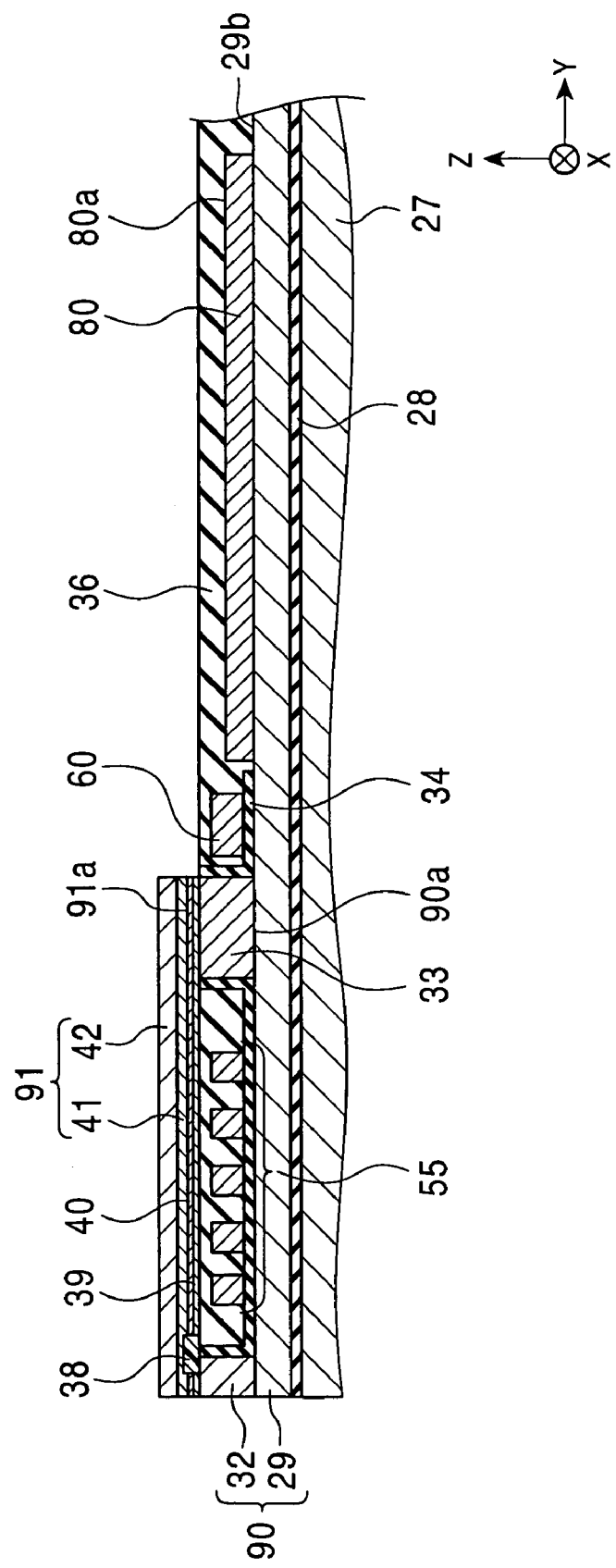
FIG. 13 is a schematic view showing a step performed following the step shown in FIG. 12.

In the step shown in FIG. 13, the Gd determining layer 38 is formed at a predetermined distance from the surface facing a recording medium in the height direction (Y direction in the figure). Next, after a plating underlayer (not shown) is formed over the protruding layer 32 to the back gap layer 33 other than the Gd determining layer 38, the lower magnetic layer 39, the gap layer 40, the upper magnetic layer 41, and the upper core layer 42 are consecutively formed from the bottom in that order by plating.

The upper magnetic layer 41 and the upper core layer 42 collectively form the second magnetic core 91.

As shown in FIG. 13, the connecting region 90a is provided at the height direction side of the lower core layer 29 forming the first magnetic core 90. On the lower core layer 29 forming the first magnetic core 90 in the connecting region 90a, the back gap layer 33 is formed so as to be connected to the upper magnetic layer 41 forming the second magnetic core 91, and hence the first magnetic core 90 and the second magnetic core 91 are connected to each other at the height direction side. In the upper magnetic layer 41 forming the second magnetic core 91 described above, a part facing the back gap layer 33 corresponds to the connecting region 91a of the second magnetic core 91.

In the embodiment shown in FIG. 13, since the lower magnetic layer 39 and the gap layer 40 are formed between the second magnetic core 91 and the back gap layer 33 at the height direction side of the Gd determining layer 38, the first magnetic core 90 and the second magnetic core 91 are indirectly connected to each other with the lower magnetic layer 39 and the gap layer 40 interposed therebetween. However, at the height direction side of the Gd determining layer 38, the lower magnetic layer 39 and the gap layer 40 may not be formed, and in this case, the first magnetic core 90 and the second magnetic core 91 is to be directly connected to each other.

The four layers from the lower magnetic layer 39 to the upper core layer 42 collectively form the magnetic layer 62.

In the present invention, the lower magnetic layer 39 may not be formed at the side (the side of the surface facing a recording medium) opposite to the height direction side of the Gd determining layer 38; however, when the lower magnetic layer 39 is provided, formation of narrower gap can be realized.

Figure 14:
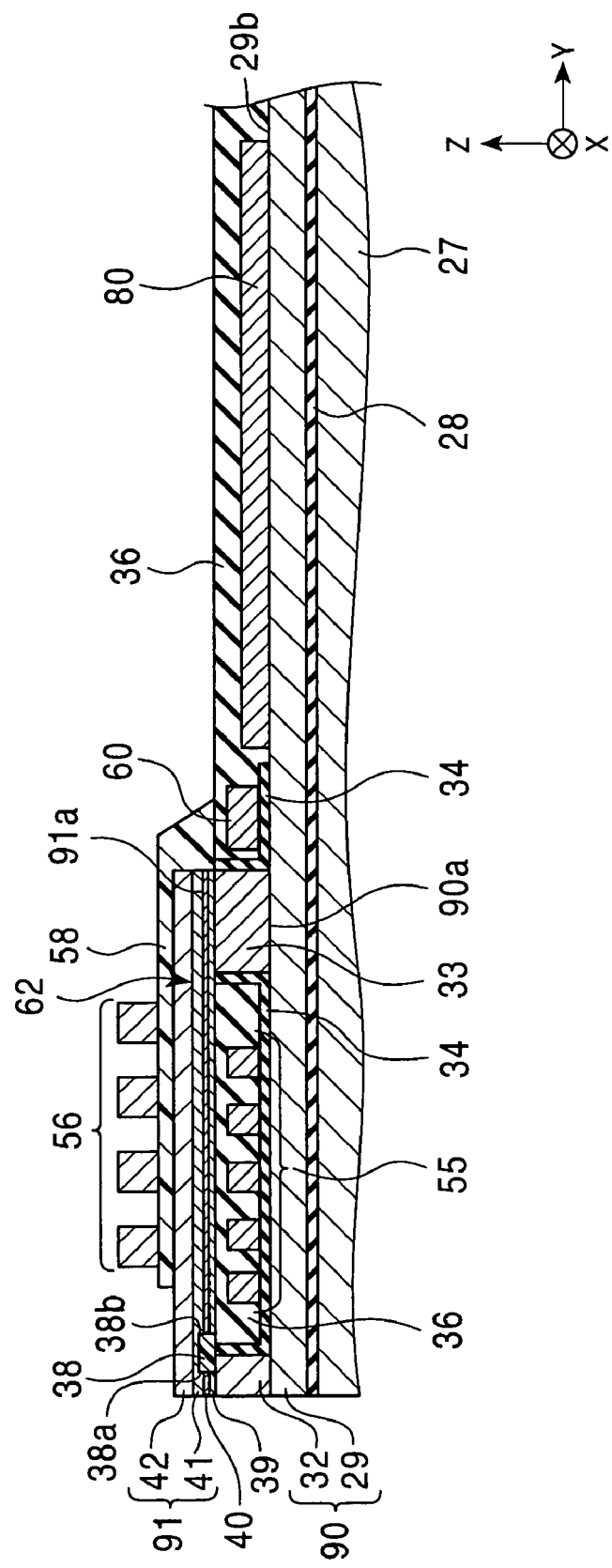
FIG. 14 is a schematic view showing a step performed following the step shown in FIG. 13.

Next, in the step shown in FIG. 14, over the upper core layer 42 to a part of the coil insulating layer 36 located at the height direction side of the back gap layer 33, the insulating layer 58 is formed.

Subsequently, the second coil pieces 56 are formed on the insulating layer 58 so as to intersect the magnetic layer 62. The second coil pieces 56 are formed of at least one non-magnetic metal material, such as Au, Ag, Pt, Cu, Cr, Al, Ti, NiP, Mo, Pd, or Rh, by plating or may be formed to have a multilayer structure made of the non-magnetic metal materials mentioned above.

When the second coil pieces 56 are formed, as shown in FIG. 3, the connecting portions 55a of the first coil pieces 55 are connected to the respective connecting portions 56a of the second coil pieces 56, which face each other in the Z direction in the figure, and the connecting portions 55b of the first coil pieces 55 are connected to the respective connecting portions 56b of the second coil pieces 56, thereby forming the toroidal coil layer 57.

Figure 15:
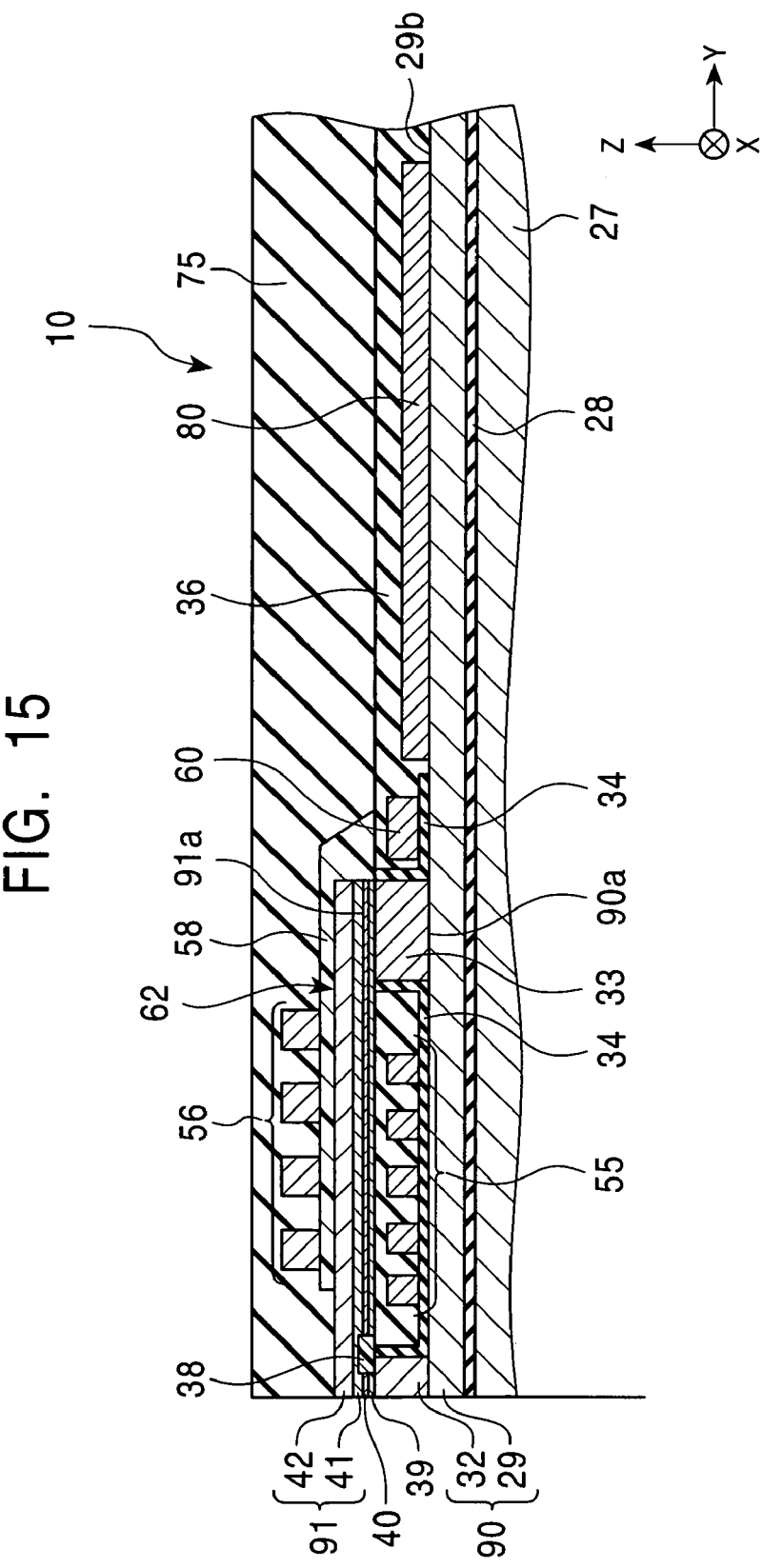
FIG. 15 is a schematic view showing a step performed following the step shown in FIG. 14.

Subsequently, the protective layer 75 shown in FIG. 1 is formed using $Al_2O_3$ or the like so as to form the structure shown in FIG. 15, thereby forming the thin film magnetic head 10.

Heretofore, the manufacturing method of the thin film magnetic head 10 shown in FIGS. 2 to 4 has been described, and in addition, when the thin film magnetic head 100 shown in FIG. 5 is manufactured, for example, the method described below may be used. That is, when being formed on the upper core layer 42 in the step shown in FIG. 14, the insulating layer 58 is formed not to be provided on a part (in the vicinity of the back gap layer 33) of the upper core layer 42, and as shown in FIG. 16, the second metal layer 190 may be formed by plating so as to be in direct contact with the part of the upper surface 42a of the upper core layer 42 at which the insulating layer 58 is not provided and to extend parallel with the upper surface 42a in the height direction.

In the case described above, the second metal layer 190 which increases the heat capacity may be formed of a material different from that for the second coil pieces 56 and may not be formed at the same time when the second coil pieces 56 are formed. However, when the same material is used for forming the second metal layer 190 and the second coil pieces 56, since the second metal layer 190 and the second coil pieces 56 can be formed at the same time, the number of the manufacturing steps can be decreased, and in addition, the thin film magnetic head 10 having a large dissipation effect can be easily manufactured.

Figure 16:
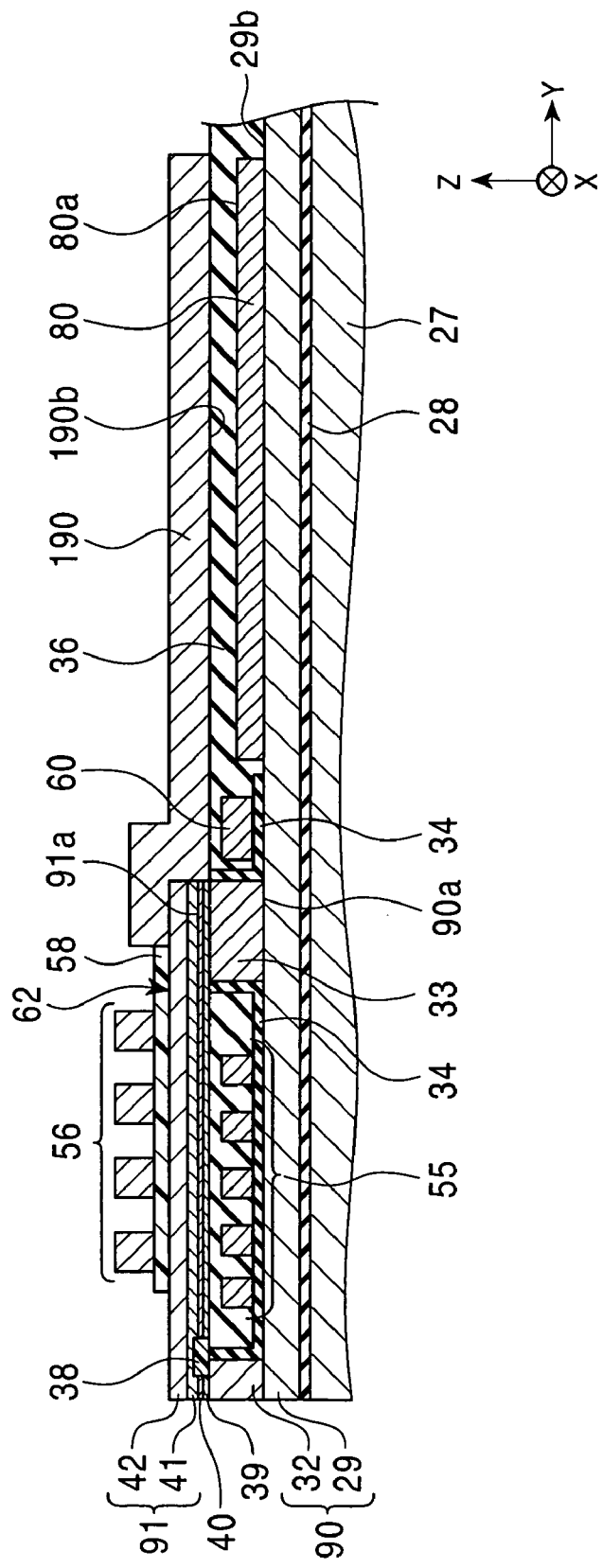
FIG. 16 is a schematic view showing one step of a method for manufacturing the thin film magnetic head shown in FIG. 5.
Figure 17:
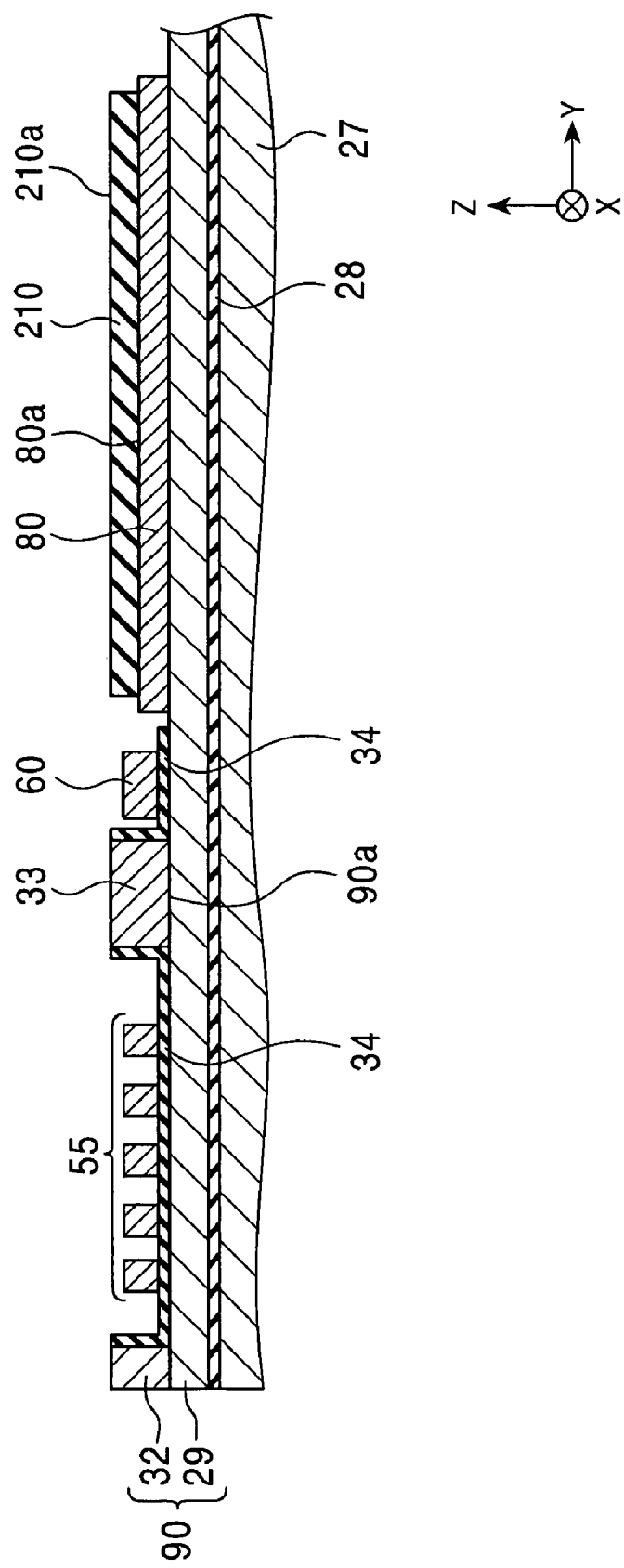
FIG. 17 is a schematic view showing one step of a method for manufacturing the thin film magnetic head shown in FIG. 7.

In addition, when the thin film magnetic head 200 shown in FIG. 7 is manufactured, after the connecting layer 210 is formed on the upper surface 80a of the first metal layer 80 in the step shown in FIG. 11 by plating or the like as shown in FIG. 17, and after the upper surface 210a of the connecting layer 210 is exposed from the coil insulating layer 36 in the step shown in FIG. 12, the second metal layer 190 may be formed so that the bottom surface 190b thereof is connected to the upper surface of the connecting layer 210 in the step shown in FIG. 16.

In addition, in order to form the structure in which the first metal layer 80 is not formed and the second metal layer 190 is only formed to be in contact with the back end surface of the magnetic layer 62 at the height direction side and to extend in the height direction, that is, for example, in the thin film magnetic head 100 shown in FIG. 5, when the structure is formed in which the first metal layer 80 is not formed and the second metal layer 190 is only formed, the following method may be used. The first metal layer 80 is not formed on the upper surface 29b of the lower core layer 29 in the back region 29a in the step shown in FIG. 11, and after the coil insulating layer 36 covers the upper surface 29b of the lower core layer 29 in the back region 29a in the step shown in FIG. 12, the second metal layer 190 may be formed so as to be in direct contact with the part of the upper surface 42a of the upper core layer 42 at which the insulating layer 58 is not provided and to extend parallel with the upper surface 42a of the upper core layer 42 in the height direction.

The thin film magnetic head of the present invention is not limited to the embodiments described above, and according to the present invention, the structure may be formed in which the first magnetic core 90 is not provided with the protruding layer 32. In addition, according to the present invention, the structure may be formed in which the back gap layer 33 functioning as the connecting layer is not provided for the first magnetic core 90, and in which the first magnetic core 90 and the second magnetic core 91 are connected to each other without the back gap layer 33 interposed therebetween.

The thin film magnetic head of the present invention described above in detail is to be embedded, for example, in a magnetic head device used for a hard disc apparatus. The thin film magnetic head described above may be used for both a floating type magnetic head and a contact type magnetic head. In addition, the thin film magnetic head described above may be used for magnetic sensors or the like in addition to the hard disc apparatuses.

In the thin film magnetic head of the present invention described above in detail, the first or the second metal layer made of a conductive material is formed to be in direct contact with at least one of the first magnetic core and the second magnetic core and to extends parallel with the upper surface of the magnetic core in the height direction. Accordingly, since the heat capacities of the first and the second magnetic cores can be increased, the heat caused by eddy current generated in the magnetic core and the joule heat generated in the coil layer, in particular, the heat generated in the coil layer and/or in the vicinity of the surface facing a recording medium, can be easily dissipated by the presence of the first or the second metal layer described above, and as a result, the PTP problem caused by the heat generated in the vicinity of the surface facing a recording medium can be suppressed.

In addition, in the manufacturing method of a thin film magnetic head, according to the present invention, the first and the second metal layers increasing the heat capacities of the magnetic cores are formed of the same conductive material as that for the first and the second coil pieces, which collectively form the toroidal coil layer, and in addition, the first and the second metal layers are simultaneously formed with the first and the second coil pieces, respectively. As a result, a thin film magnetic head having a larger dissipation effect can be easily formed with a smaller number of the manufacturing steps.

What is claimed is:

1. A method for manufacturing a thin film magnetic head comprising:
    a step (a) of forming a first magnetic core extending from a surface facing a recording medium in a height direction so as to have a back region extending from a connecting region in the height direction, the connecting region being a region in which the first magnetic core is connected to a second magnetic core which is formed in a subsequent step;
    a step (b) of, after a coil insulating underlayer is formed on the first magnetic core, forming first coil pieces from a first conductive material on the coil insulating underlayer at a side of the surface facing the recording medium with respect to the connecting region,
    and simultaneously forming a first metal layer from said first conductive material on the first magnetic core in the back region located from the connecting region in the height direction;
    a step (c) of forming a coil insulating layer for covering the first coil pieces;
    a step (d) of forming the second magnetic core above the first magnetic core, in which the second magnetic core faces the first magnetic core at the surface facing the recording medium with a gap layer interposed therebetween, extends over the coil insulating layer to the first magnetic core in the connecting region, and is magnetically connected with the first magnetic core in the connecting region directly or indirectly with a back gap layer of a magnetic material interposed therebetween; and
    a step (e) of forming a toroidal coil layer which is toroidally wound around the second magnetic core by forming an insulating layer on the second magnetic core, forming second coil pieces from a second conductive material on the insulating layer, and connecting the second coil pieces to the respective first coil pieces, and simultaneously with the formation of the second coil pieces forming a second metal layer, which is electrically connected to the first metal layer from the second conductive material so as to be in contact with a back end surface of the second magnetic core at a height direction side and so as to extend in the height direction.

2. The method for manufacturing a thin film magnetic head, according to claim 1, further comprising electrically insulating the toroidal coil layer from the first metal layer formed on the upper surface of the first magnetic core in the back region and the second metal layer extending from the back end surface of the second magnetic core in the height direction.

3. The method for manufacturing a thin film magnetic head, according to claim 1, further comprising, after the step (b) and before the step (c), forming a connecting layer on the first metal layer, wherein the second metal layer is formed on the connecting layer in the step (e).

* * * * *